United States Patent
LaVigne et al.

(10) Patent No.: US 7,596,741 B2
(45) Date of Patent: Sep. 29, 2009

(54) PACKET PROTECTION FOR HEADER MODIFICATION

(75) Inventors: Bruce E. LaVigne, Roseville, CA (US); John A. Wickeraad, Granite Bay, CA (US); Jonathan M. Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 11/102,973

(22) Filed: Apr. 11, 2005

(65) Prior Publication Data

US 2006/0242543 A1    Oct. 26, 2006

(51) Int. Cl.
*H03M 13/00* (2006.01)
(52) U.S. Cl. .......................... 714/776; 714/765; 714/47
(58) Field of Classification Search ................. 714/776, 714/764, 800, 819, 718, 44, 47, 765, 19
See application file for complete search history.

(56) References Cited

U.S. PATENT DOCUMENTS

| | | | |
|---|---|---|---|
| 4,947,396 A * | 8/1990 | Shin et al. .................... 714/768 |
| 6,601,217 B1 * | 7/2003 | Smith .......................... 714/822 |
| 6,745,360 B1 * | 6/2004 | Srinivas et al. ............... 714/748 |
| 6,778,554 B2 | 8/2004 | Thrysoe |
| 6,804,257 B1 * | 10/2004 | Benayoun et al. ........... 370/471 |
| 6,810,045 B1 | 10/2004 | Brune et al. |
| 6,850,495 B1 | 2/2005 | Baum et al. |
| 6,944,168 B2 * | 9/2005 | Paatela et al. ................ 370/401 |
| 7,185,266 B2 * | 2/2007 | Blightman et al. ........... 714/776 |
| 2006/0002304 A1 * | 1/2006 | Ashwood-Smith ........... 370/238 |

* cited by examiner

*Primary Examiner*—Scott T Baderman
*Assistant Examiner*—Fritz Alphonse

(57) ABSTRACT

A network device is provided which can include logic associated with the operations of a data communications protocol stack. The logic can operate to receive a packet to the network device and apply a first error checking technique, having a first modification complexity, to a header of the packet. The logic can apply a second error checking technique, having a second modification complexity that is greater than the first modification complexity, to a body of the packet. A first verification key can be provided to a first header associated with the packet and a second verification key, having a different modification complexity from the first verification key, can be provided for a second header associated with the packet.

15 Claims, 6 Drawing Sheets

PACKET PROTECTION FOR HEADER MODIFICATION

BACKGROUND

Internal protocol (IP) has become the standard for all forms of electronic communications including data, voice, video, etc. FIG. 1 is a chart comparing the transmission control protocol/internet protocol (TCP/IP) stack to the earlier model of the open systems interconnection (OSI) protocol stack. As shown in FIG. 1, the OSI stack differentiated seven layers. These included the application layer (7), presentation layer (6), session layer (5), transport layer (4), network layer (3), data link/media access control (MAC) layer (2), and the physical layer (1). The TCP/IP stack formally has five layers which accomplish the services of the original OSI stack. When one application wants to communicate with another application, data runs up and down the layers in the stack. That is, data is passed from an application layer down through each of the layers before it actually moves out onto a physical connection. And, similarly at a receiving end the data is passed from the physical layer up through each of the layers to a recipient application.

A layer 3 switch in a receiving network device will modify an Ethernet packet header as it flows back up the TCP/IP stack. This creates an issue for protecting a packet from soft errors. In other words, an Ethernet cyclical redundancy check (CRC) that is part of the packet as it enters the layer 3 switch will no longer be valid if the header portion of the packet is modified. Some approaches ignore the error check detection associated with the Ethernet CRC while packet header modification occurs in going through a layer 3 switch since a new Ethernet CRC will be generated upon leaving the layer 3 switch. This may be done to avoid the overhead of having to continually change the Ethernet CRC over the course of the layer 3 switch operations. However, this ignores the soft errors that can occur as packets are passed in and out of memory and flip-flops as the packet moves through the layer 3 switch. Sometimes memory with error correcting code (ECC) logic is used to handle the soft errors which are otherwise ignored above. ECC is a memory system that tests for and corrects errors automatically. When writing the data into memory, ECC circuitry generates checksums from the binary sequences in the bytes and stores them in an additional seven bits of memory for 32-bit data paths or eight bits for 64-bit paths. When data are retrieved from memory, the checksum is recomputed to determine if any of the data bits have been corrupted. To note, ECC involves additional memory associated with the ECC bits, which increases the cost. The ECC operation also takes time, slowing the memory interface down. Even with ECC memory, the flip-flops in the data path are not protected from soft errors.

DETAILED DESCRIPTION

Embodiments of the present invention provide packet protection for header modification. For example, when packets are moved up and down a TCP/IP protocol stack, logic is provided to verify the accuracy of data within one or more header portions of as well as for the body portion of the packet. According to various embodiments two or more verification keys are included with the packet. One verification key, i.e., bit or string of bits used by an error checking technique, is associated with one or more header portions of the packet which may be modified. Another verification key is associated with the body, e.g., data (message), portion of the packet which may not be intended for modification over the course of transmission. According to various embodiments two different verification keys are associated with the different portions of the packet, i.e., the modifiable headers vs. the packet body.

Various instruction (e.g., computer executable instructions) and logic embodiments allow the two verification keys to be checked, modified, and/or operated upon separately. Thus, one verification key can be checked, modified, and/or operated on, e.g., if an error is detected, without having to modify the other verification key. Additionally, the verification key associated with the one or more header portions of the packet is more easily modified and verified than the verification key associated with the body of the packet. In this manner, headers to a packet can be readily changed yet still error checked without having to continually modify a single verification key associated with the entire packet, e.g., Ethernet CRC. At the same time, potential soft errors which may occur while the packet is being moved in and out of memory and flip-flops as the packet moves through the layer 3 switch are not ignored.

It is noted that while embodiments are discussed in reference to a layer 3 switch, the embodiments are not so limited. One of ordinary skill in the art will appreciate the manner in which the techniques described herein can be applied to other protocol stack layers associated with data, voice, and video transmission.

Exemplary Data Transport Through TCP/IP

Figures 1, 2:
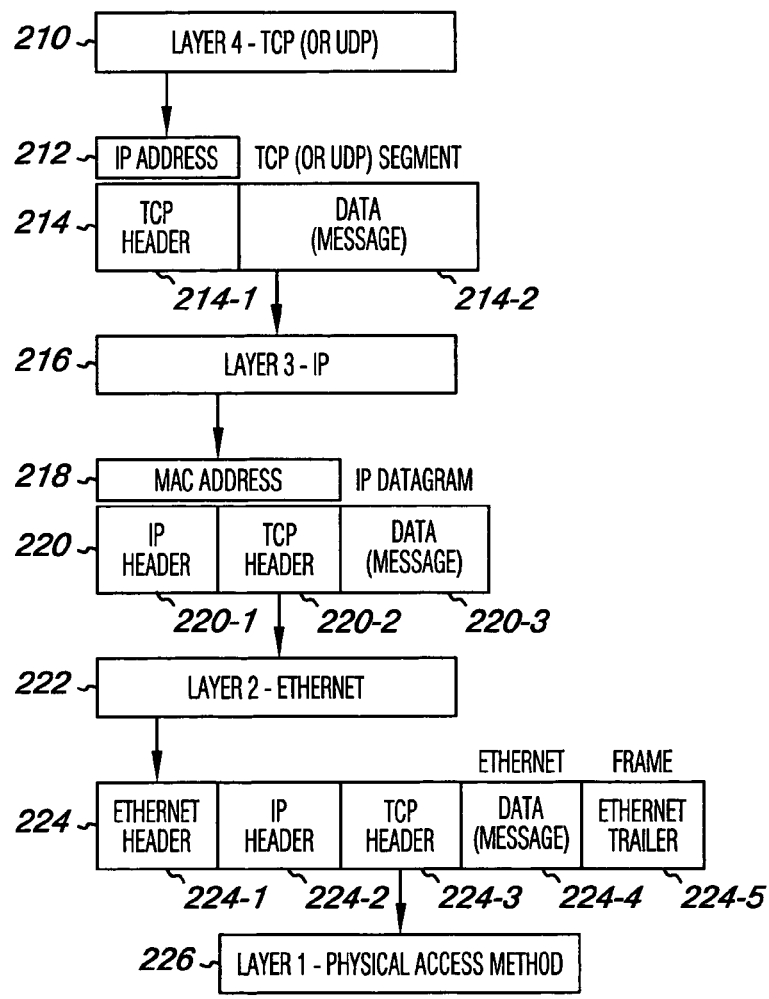
FIG. 1 is a chart comparing the OSI protocol stack to the TCP/IP protocol stack.
FIG. 2 illustrates a portion of the process in the TCP/IP stack as data is moved from the transport layer to the physical layer.

FIG. 2 illustrates a portion of the process in the TCP/IP stack as data is moved from the transport layer (layer 4) 210 to the physical layer (layer 1). Layer 4 typically receives a stream of data bytes, e.g., data message, from an application along with a socket of the destination machine. A socket is a software construct which is a combination of an IP address and logical port number assigned to every application. Layer 4 uses TCP (or universal datagram protocol (UDP)) 210 to establish a connection between two network devices for data communication and negotiates the size of packets for data transfer. At 214, Layer 4 attaches a TCP header 214-1 onto the data (message) 214-2. The TCP header 214-1 can contain source and destination ports information as well as sequence number information for the packet 214-2. Layer 4 then passes the new packet 214, including the TCP header 214-1 and original data message 214-2 (along with an IP address 212) to layer 3 (the network layer)

In networking, the IP of layer 3, e.g., layer 3 switch, provides the communication protocol 216 for connecting one application with another application. Layer 3 accepts the packets 220 and prepares them for the data link protocol layer below by turning the IP addresses into media access control (MAC) addresses 218. Layer 3 adds an IP header 220-1 to the TCP header 220-2 and to the data (message) 220-3. The IP header 220-1 includes source and destination IP addresses. Layer then hands the packet 220 over to the data link layer (layer 2-Ethernet) 222 along with the MAC address, e.g., Ethernet address, of a target network device. Layer 2 uses a data link protocol such as Ethernet to move the packet 224 on across a physical connection 226 (layer 1). As shown in FIG. 2, layer 2 will add an Ethernet header 224-1 and an Ethernet trailer 224-5 to the IP header 224-2, the TCP header 224-3, and the original data (message) 224-4.

In the above process data is moved in and out of various memories, e.g. random access memory (RAM), buffers (flip-flops), etc., where the potential exists for data corruption. Some data corruption is immediately detectable, but other data corruption may not be. The most common form of data corruption within the layer 3 switch is due to soft errors. Soft errors are errors where the underlying hardware is not broken, but a transient effect, e.g., an alpha particle hit, has cause an error to the data. Such a soft error may only affect a single packet and is not reproducible. However, the packet is now corrupt and should not be passed along as valid, if possible. Additionally, it is possible that the error is serious enough to cause the layer 3 switch to cease operating entirely.

One goal in maintaining networks is to reduce the rate of undetected data errors of any kind, soft errors being the most likely, also referred to as soft error rate (SER). There are ways to reduce SER, e.g., using ECC. However, as mentioned above, ECC is expensive. Various other error checking techniques, such as cyclical redundancy checks (CRCs) of various bit lengths, e.g., 16, 32, etc., are also used and appended to a packet in an attempt to ensure the accuracy of the data in transmission. For example, the above described Ethernet trailer (e.g., 224-5) can include a cyclical redundancy check (CRC). Using CRCs, transmitted messages are divided into predetermined lengths which, used as dividends, are divided by a fixed divisor. The remainder of the calculation is appended onto and sent along with the message. At the receiving end, logic recalculates the remainder and if it does not match the transmitted remainder an error is detected and the message is discarded as invalid.

Exemplary Network

Figure 3:
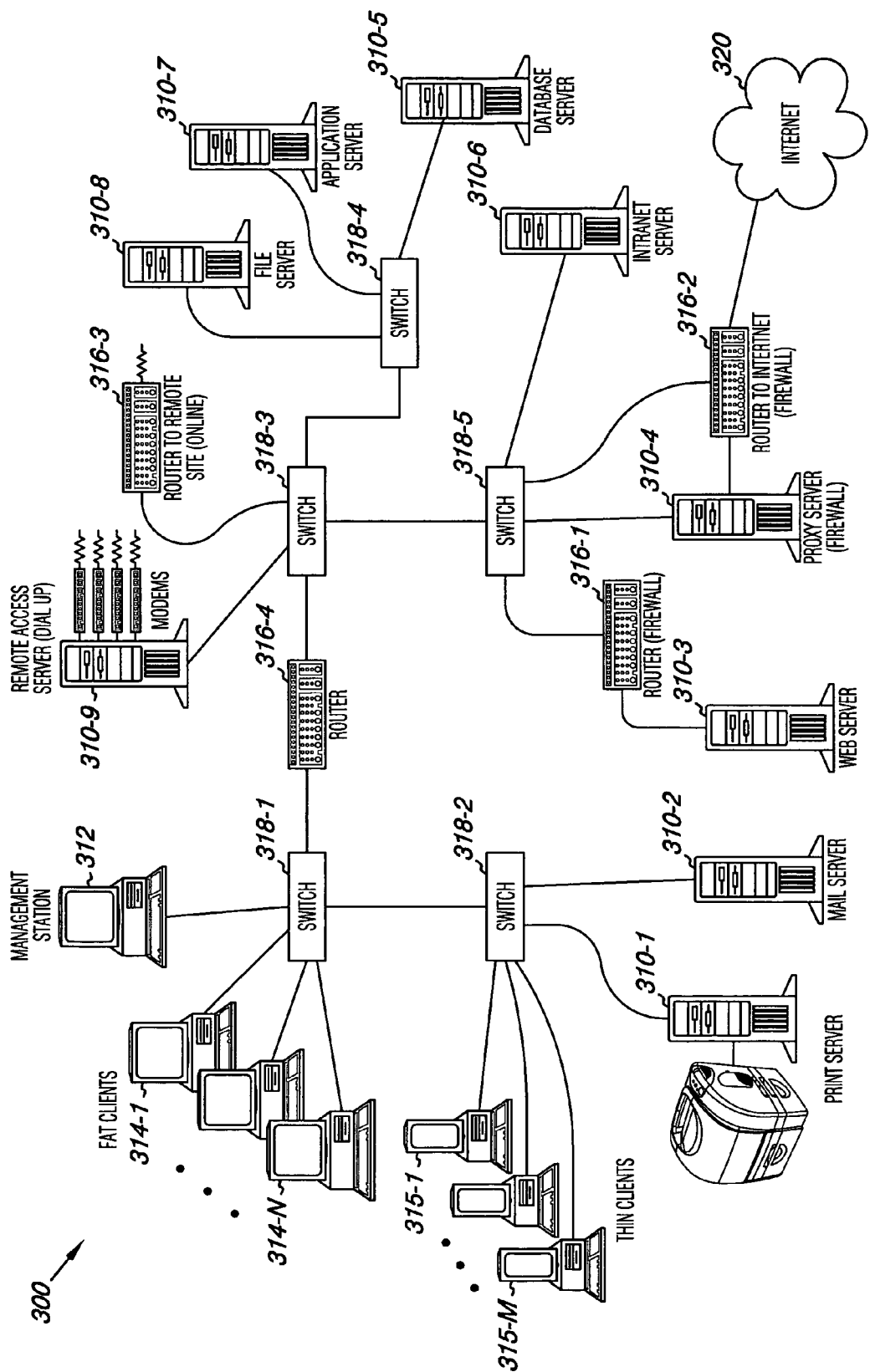
FIG. 3 illustrates an exemplary network in which embodiments of can be used.

FIG. 3 illustrates an exemplary network 300 in which embodiments of the present invention can be used. As shown in FIG. 3, a number of devices, e.g., PCs, servers, peripherals, etc., can be networked together via a LAN and/or WAN via routers, hubs, switches, and the like (referred to herein as "network devices"). The embodiment of FIG. 3 illustrates clients and servers in a LAN. However, embodiments of the invention are not so limited. For example, the embodiment of FIG. 3 shows various servers for various types of service on a LAN.

The exemplary network of FIG. 3 illustrates a print server 310-1 to handle print jobs for the network 300, a mail server 310-2, a web server 310-3, a proxy server (firewall) 310-4, a database server 310-5, and intranet server 310-6, an application server 310-7, a file server 310-8, and a remote access server (dial up) 310-9. Again, the examples provided here do not provide and exhaustive list. The embodiment of FIG. 3 further illustrates a network management station 312, e.g., a PC or workstation, a number of "fat" clients 314-1, . . . , 314-N which can also include PCs and workstations and/or laptops, and a number of "thin" clients 315-1, . . . , 315-M which can include terminals and/or peripherals such as scanners, facsimile devices, handheld multifunction device, and the like.

The designators "N" and "M" are used to indicate that a number of fat or thin clients can be attached to the network 300. The number that N represents can be the same or different from the number represented by M. The embodiment of FIG. 3, illustrates that all of these example network devices can be connected to one another and/or to other networks via routers, 316-1, 316-2, 316-3, and 316-4, and hubs and/or switches 318-1, 318-2,318-3, 318-4, and 318-5, as the same are known and understood by one of ordinary skill in the art. The network of FIG. 3 is further illustrated connected to the Internet 320 via router 316-2. As the reader will appreciate, the network 300 shown in FIG. 3 can additionally be connected to any type of radio frequency (RF) (e.g., GSM, ANSI, satellite, etc.), circuit-switched, (e.g., PSTN), and/or packet-switched network, etc. Embodiments of the invention, however, are not limited to the number and/or type of network devices in FIG. 3's illustration.

As one of ordinary skill in the art will appreciate, many of these devices include processor, logic such as application specific integrated circuits (ASICs), and memory hardware. By way of example and not by way of limitation, the network management station 312 will include a processor, logic, and memory as the same are well known to one of ordinary skill in the art. Similarly, the network devices of routers, 316-1, 316-2, 316-3, and 316-4, hubs and/or switches 318-1, 318-2, 318-3, 318-4, and 318-5, and, and the number of fat clients 314-1, . . . , 314-N and the number of thin clients 315-1, . . . , 315-M, can include processor, logic, and memory. Embodiments of the invention are not limited, for the various devices in the network, to the number, type, or size of processor and memory resources.

Logic and/or program instructions can operate in conjunction with an application program according to an application protocol such as file transfer protocol (FTP), telnet, hypertext transport protocol (HTTP), simple mail transfer protocol (SMTP), simple network management protocol (SNMP), domain name system (DNS), routing information protocol (RIP), windows internet name system (WINS), etc., and can additionally operate with other TCP/IP layer protocols such as address resolution protocol (ARP), internet control message protocol (ICMP), fiber distributed data interface (FDDI), Ethernet, synchronous optical network (SONET), asynchronous transfer mode (ATM) protocols, etc., to exchange data between the various network attached devices shown in FIG. 3. Logic and/or program instructions (e.g., computer executable instructions) are provided to the various network devices to achieve the functions described in more detail below.

Exemplary Network Device

Figure 4:
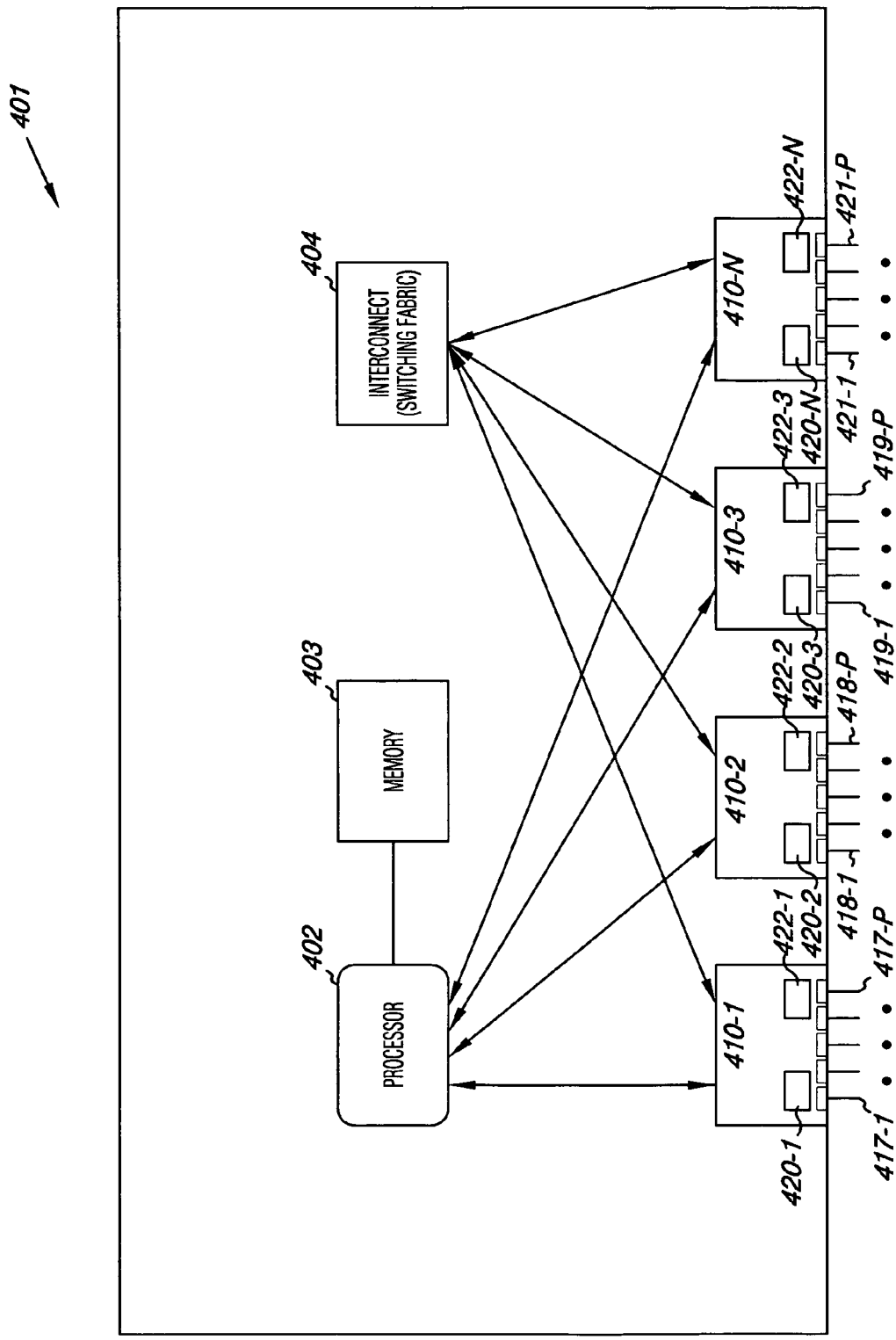
FIG. 4 illustrates an exemplary network device in which instruction and logic embodiments can be performed.

FIG. 4 illustrates an exemplary network device 401 in which instruction and logic embodiments can operate to perform the functions described herein. The exemplary network device 401 illustrated in FIG. 4 can represent a switch and/or router such as those illustrated and discussed in connection with FIG. 3. As shown in FIG. 4, the network device 401 includes at least one processor 402 responsible for processing packets, used in the network device's operation, which are received to network chips on the device, e.g., network chips 410-1, 410-2, 410-3, . . . , 410-N. As shown the processor can be connected to a memory 403, i.e., computer-readable media, having computer-executable instructions or data fields stored thereon. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions. Combinations of the above are also included within the scope of computer-readable media.

The network chips 410-1, 410-2, 410-3, . . . , 410-N can be application specific integrated circuits (ASICs) and include layer 3 functionality. The functions of layer 3 were originally performed by software, but more commonly today are performed by logic such as can be found on an application specific integrated circuit (ASIC). This logic is often referred to as a layer 3 switch. The designator "N" is used to indicate that a number of network chips can be included on the network device 401. Each of these network chips can include logic and memory resources, shown as 420-1, 420-2, 420-3, . . . , 420-N and 422-1, 422-2, 422-3, . . . , 422-N respectively. As illustrated in FIG. 4, the number of network chips 410-1, 410-2, 410-3, . . . , 410-N can be connected to one another through a high speed interconnect, e.g., switching fabric or crossbar circuit, 404 as the same are known and understood by one of ordinary skill in the art. In the embodiment of FIG. 4, each of the network chips 410-1, 410-2, 410-3, . . . , 410-N are illustrated connected to the processor 402. Embodiments are not limited to the architecture and/or the number of network chips included on a given network device 401.

Each of the number of network chips 410-1, 410-2, 410-3, . . . , 410-N are provided with external ports to handle the exchange of data packets, e.g., Ethernet packets, (hereinafter "packets") to and from the network device 401 over a physical layer, e.g., layer 1 of a TCP/IP protocol stack. The network chips are illustrated with external ports 417-1, . . . , 417-P, 418-1, . . . , 418-P, 419-1, . . . , 419-P, and 421-1, . . . , 421-P, respectively. The designator "P" is used to indicate that a number of external ports can be included on a given network chip.

Packets may arrive to and be transmitted from an external network port, e.g., ports 417-1, . . . , 417-P, 418-1, . . . , 418-P, 419-1, . . . , 419-P, 421-1, . . . , 421-P (thus network chips, e.g., 410-1, 410-2, 410-3, . . . , 410-N) and may be transmitted to the processor 402. In the course of transmission, to and from the external network ports 417-1, . . . , 417-P, 418-1, . . . , 418-P, 419-1, . . . , 419-P, 421-1, . . . , 421-P, packets including data will move between the various layer in a communications protocol stack, e.g. TCP/IP.

According to various embodiments described below, the logic 420-1, 420-2, 420-3, . . . , 420-N (in the form of hardware or software available as instructions in 422-1, 422-2, 422-3, . . . , 422-N, hereinafter "logic") can operate to verify the accuracy of data within one or more header portions of a packet as well as for the body portion of the packet as it passes through a layer 3 switch function such as can exist on the network chips, e.g., 410-1, 410-2, 410-3, . . . , 410-N. One of ordinary skill in the art will appreciate upon reading this disclosure that, a given network port, e.g., 417-1, . . . , 417-P, 418-1, . . . , 418-P, may be a set of integrated circuit chips including processor, network interface card (NIC), and memory resources combined, etc.

PACKET PROTECTION EMBODIMENTS

Figure 5:
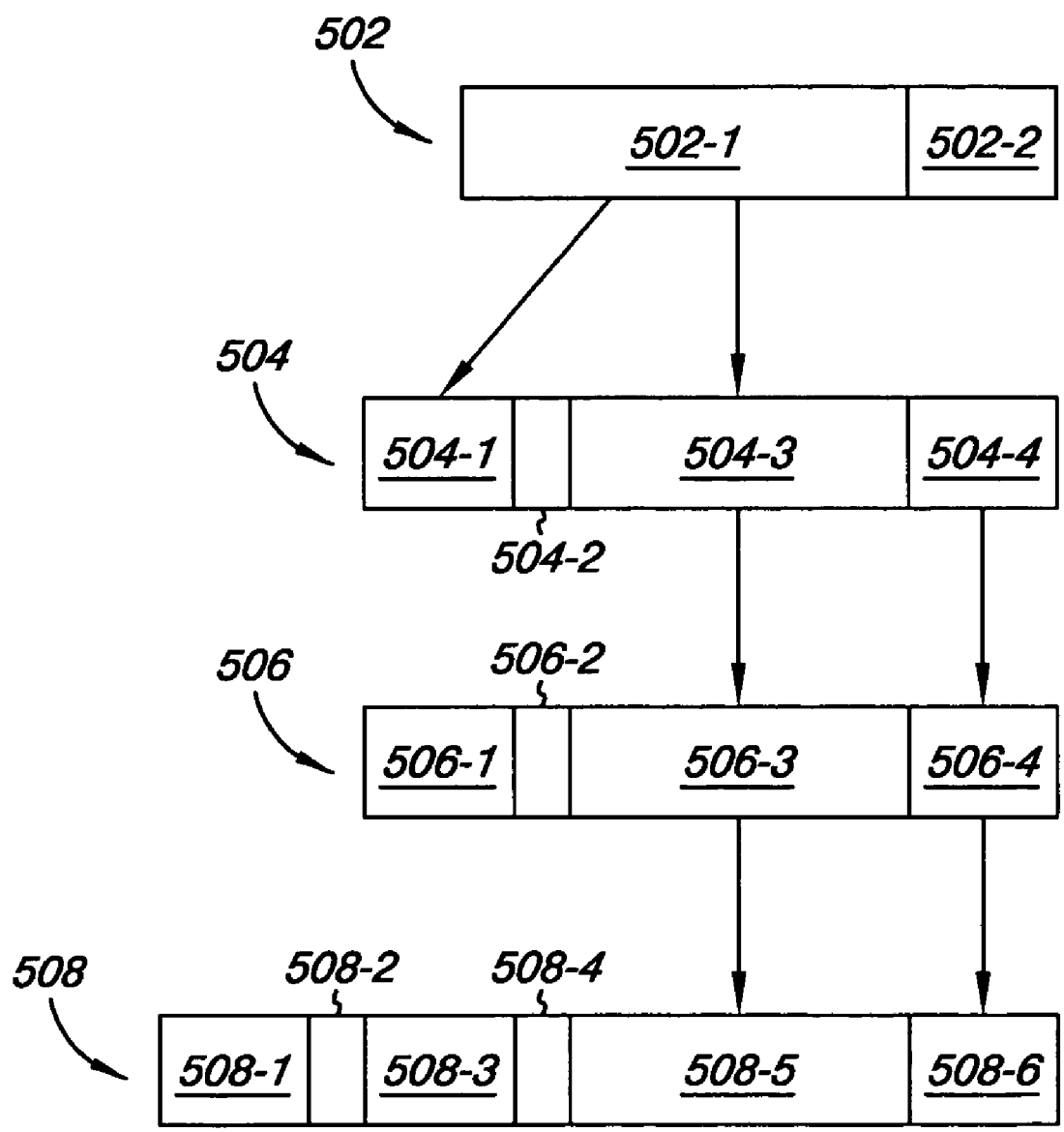
FIG. 5 illustrates a sequence embodiment for data packet configuration that provides packet protection for header modification.

FIG. 5 illustrates a sequence embodiment for data packet configuration that provides packet protection for header modification. As described above a packet 502, e.g., Ethernet frame, can be received to a network device and operated thereon according to logic embodiments described herein. Thus, the embodiment of FIG. 5 illustrates a packet 502 including a data (message) portion 502-1. The packet 502 may be received already having some form of verification key 502-2 associated therewith. For example, an Ethernet frame 502 can include an Ethernet trailer 502-2, e.g., a thirty two (32) bit CRC, appended to the data portion 502-1. As the Ethernet frame is received to a network device and run up and down a communications protocol stack, e.g., TCP/IP, therein the logic and/or instructions embodiments can operate on the trailer to check whether the data portion 502-1 of the frame 502 has been corrupted. As one of ordinary skill in the art will appreciate the verification key 502-2, e.g., 32 bit CRC, may be regenerated as the frame 502 moves between layers within the communications protocol stack, e.g., TCP/IP stack. A TCP/IP stack will hereinafter be referred to for ease of reference. However, the reader will appreciate that embodiments are not limited to data transmission involving a TCP/IP protocol stack.

In packet 504, the original data packet, e.g., incoming Ethernet packet, is split into an front portion 504-1, which contained the modifiable headers such as destination address, source address, length and type information, etc., and a secondary body portion 504-3. In addition, the CRC 504-4 is now different that the CRC 502-2, since it covers a smaller portion of the packet 504. According to embodiments, the front portion 504-1 of the packet is provided with its own verification key 504-2 which can be checked, modified, and operated on independently from the data portion 504-3 of the packet 504. The CRC 504-4 associated with the body portion 504-3 can likewise be checked independently from the front portion 504-1 of the packet 504. If an Ethernet CRC 504-4 is invalid in relation to the data portion 504-3 of the packet 504 when the data packet arrives to a particular layer of the TCP/IP stack it will continue to be invalid regardless of the logic operations on the header 504-1 portion of the packet 504. And, if an Ethernet CRC 504-4 is valid in relation to the data portion 504-3 of the packet 504 when the data packet arrives to a particular layer of the TCP/IP stack it will continue to be valid after the logic operations on the header 504-1 portion of the packet 504.

According to various embodiments, the verification key associated with one or more front portion 504-1 of packet 504 can be a different type of verification key, e.g., according to a different error checking technique, than the verification key associated with the body 504-3 portion of the packet. For example, the verification key 504-4, e.g., "first" verification key, associated with the body 504-3 portion of the packet can include an error checking technique having a different modification complexity than the verification key 504-2, e.g., "second" verification key, associated with the front portion 504-1 of the packet 504. For example, the first verification key associated with the body portion 504-3 can be a 32-bit CRC, and the second verification key associated with the front portion 504-1 can be a parity bit, a checksum, etc. As noted above, using CRCs, transmitted messages are divided into predetermined lengths which, used as dividends, are divided by a fixed divisor. The remainder of the calculation is appended onto and sent along with the message. At the receiving end, logic recalculates the remainder and if it does not match the transmitted remainder an error is detected and the message is discarded as invalid. As the reader will appreciate the only reasonable way to verify a CRC is to check all of the bytes associated with that CRC.

By contrast, parity is an error detection technique that adds an extra parity cell to each byte or set of bytes of memory and an extra parity bit to each byte of transmitted data. The value of the ninth bit (0 or 1) depends on the pattern of the byte's eight bits. Each time a byte or set of bytes is transmitted, the parity bit is checked, e.g., by a memory controller. Thus, parity allows for the checking of individual bytes which have been modified, e.g., in a header. "Even" parity systems make the parity bit 1 when an even number of 1 bits are in the byte. "Odd" parity systems make the parity bit 1 when an odd number of 1 bits are present. Parity checking cannot detect the condition in which two data bits are in error, because they would cancel themselves. The parity bit would still be correct for that sequence of 0s and 1s. Thus, ECC and CRCs are more robust error checking systems.

A checksum is created by calculating the binary values in a block of data using some algorithm and storing the results with the data. When the data are retrieved from memory or received at the other end of a network, a new checksum is computed and matched against the existing checksum. A non-match indicates error. A checksum can test a block of data. They can detect single bit errors and some multiple bit errors, but are not as robust as a CRC. Still, checksums prove useful for testing individual bytes which have been modified, e.g., in a header. As such, both checksums and parity error checking techniques are less complex error checking techniques than are CRCs, and lend themselves to modification due to intended changes to the protected data. Thus, in the above example, the second verification key 504-2, e.g., parity or checksum associated with the front portion 504-1 of the packet 504 is more easily modified and verified than the first verification key 504-4 associated with the body 504-3 of the packet 504.

In one embodiment, the first verification key 504-4 associated with the body 504-3 of the packet 504 includes 32 bits, e.g., a 32 bit CRC. And, the second verification key 504-2 includes 1-16 bits, e.g., according to a parity, checksum, etc. Accordingly, the front portion 504-1 to the packet 504 can be readily changed yet still error checked without having to continually modify a single, lengthier 32 bit CRC verification key associated with the entire packet, e.g., Ethernet CRC. Further, as the packet 504 is passed in and out of memory, e.g., RAM, and/or buffers, e.g., flip-flops (which can have a measurable soft error rate as transistor design scales shrink), within a given layer, e.g., a layer 3 switch, the different header 504-1 and body 504-3 portions of the packet 504 can be re-checked and operated on accordingly.

Packet 506 illustrates that in another given layer of the TCP/IP protocol stack a different header can be added to the data portion of the packet, again as was mentioned above in connection with FIG. 2. Packet 506 is illustrated having additional information, e.g., additional forwarding information, added to the front portion 506-1 of the packet 506. Thus, in this example, as 504-1 moves forward and additional forward information is added to create 506-1 the verification 506-2 can be adjusted accordingly. In this manner, the front portion 506-1 portion of the packet is again provided with its own verification key 506-2 which can be checked, modified, and operated on independently from the data portion 506-3 of the packet 506. As shown in the embodiment, the data portion 506-3 will continue to have its own verification key 506-4 associated with it such that the data portion 506-3 can be checked independently from the front portion 506-1, e.g., modified header portion, of the packet 506.

As described above, the verification key 506-2 associated with the header 506-1 portions of a packet 506 can be a more easily modifiable type of verification key than the verification key 506-4 associated with the body 506-3 portion of the packet. That is, the "first" verification key, associated with the potentially larger, body 506-3 portion of the packet can include a 32 bit CRC, while the "second" verification key, associated with the header 506-1 portion of the packet 504 can include a parity bit, checksum, etc.

According to one embodiment, the second verification key is a parity bit and if a particular portion of the packet associated therewith is being modified, e.g., header portion 504-1, 506-1, etc., logic embodiments operate to perform exclusive OR (XOR) gate operations on the original particular portion as well as XORing the particular portion after the modification, e.g., new portion 506-1 in packet 506. If the two results from the XOR operations do not match the second verification key 506-2, e.g., parity bit, will be flipped. That is, as noted above, parity is a count of the number of bits that are set over a particular area in a packet. In this example operation, the parity error checking technique will assign one bit for every bit changed in the modification. In a reducing XORing operation, as the same will be recognized by one of ordinary skill in the art, the total changed bits can reduced down to a single bit representing an "even" or "odd" number of bit changes. In this example, if an odd number of bits have been changed the parity associated with that particular portion of the packet will be flipped, e.g., changed from 1 to 0 or vice versa.

The reader will appreciate that the potentially larger, body 506-3 portion of the packet 506 may not have to pass in and out of flip-flops in the manner that headers undergoing modification will. The body (data) portion 506-3 of the packet 506 is typically not intended to be modified during movement up and down the TCP/IP protocol stack and thus may be placed in RAM along with its associated CRC while the header modification is performed. As such, in some embodiments, re-checking the first verification key, e.g., 32 bit CRC, associated with the body 506-3 of the packet may be held off until the packet is leaving a particular TCP/IP layer, e.g., just before leaving the layer 3 switch. By contrast, according to embodiments, the header 506-2 that is being moved in and out of various buffer (flip-flops) can be re-checked a number of times while operations are being performed within a particular TCP/IP layer. While the "data" in the body 506-3 of the packet 506 may not be important to a particular TCP/IP layer, e.g., layer 3 switch, the headers, e.g., 506-2, contain important information which, if corrupt, could cause the switch to cease functioning. For example, if the length or destination information becomes corrupt, the switch may "leak" memory, or lock up and no longer forward any packets. By contrast, if the first verification key 506-4 associated with the body portion 506-3 of the packet 506 finds an error this packet may be discarded and all that will have been lost is the data to this one packet. This again illustrates why checking verification key 506-4 as the packet leaves the switch can be sufficient, e.g., in FIG. 5 504-4, 506-4, and 508-6 maintain the same CRC since the data in the body portion has not been purposefully modified as this portion of the packet traversed the layer 3 switch. The embodiments described herein thus facilitate more frequent, less complex checking of one or more second verification key(s) associated with portions of the packet which are likely to be modified, e.g., headers.

Packet 508 illustrates that in another given layer of the TCP/IP protocol stack one or more different header(s) can be added, i.e., appended, modified, etc., to the data portion of a packet. Packet 508 thus illustrates a number of headers, e.g., 508-1 and 508-3, being appended to the data portion 508-5 of the packet 508. According to embodiments, each header, 508-1 and 508-3, portion of the packet can be provided with its own verification key, e.g., 508-2 and 508-4, which can be checked, modified, and operated on independently from the data portion 508-5 of the packet 508 and potentially independently from one another. As shown in the embodiment, the data portion 508-5 can continue to have its own verification key 508-6 associated with it such that the data portion 508-5 can be checked independently from the one or more headers, 508-1 and 508-3, of the packet 508.

According to embodiments, verification keys 508-2 and 508-4 associated with the one or more headers 508-1 and 508-3 will be a more easily modifiable type of verification key than the verification key 508-6 associated with the body 508-5 portion of the packet 508. Verification keys 508-2 and 508-4 can additionally be different verification key types from one another. Thus, by way of example and not by way of limitation, a "first" verification key associated with the larger, body 508-5 portion of the packet can include a 32 bit CRC, a "second" verification key 508-2 associated with the header 508-1 can include a parity bit, and a "third" verification key 508-4 associated with header 508-3 can include a 16 bit checksum. As the reader will appreciate, the embodiments are not limited to the illustrative examples given herein.

Figure 6:
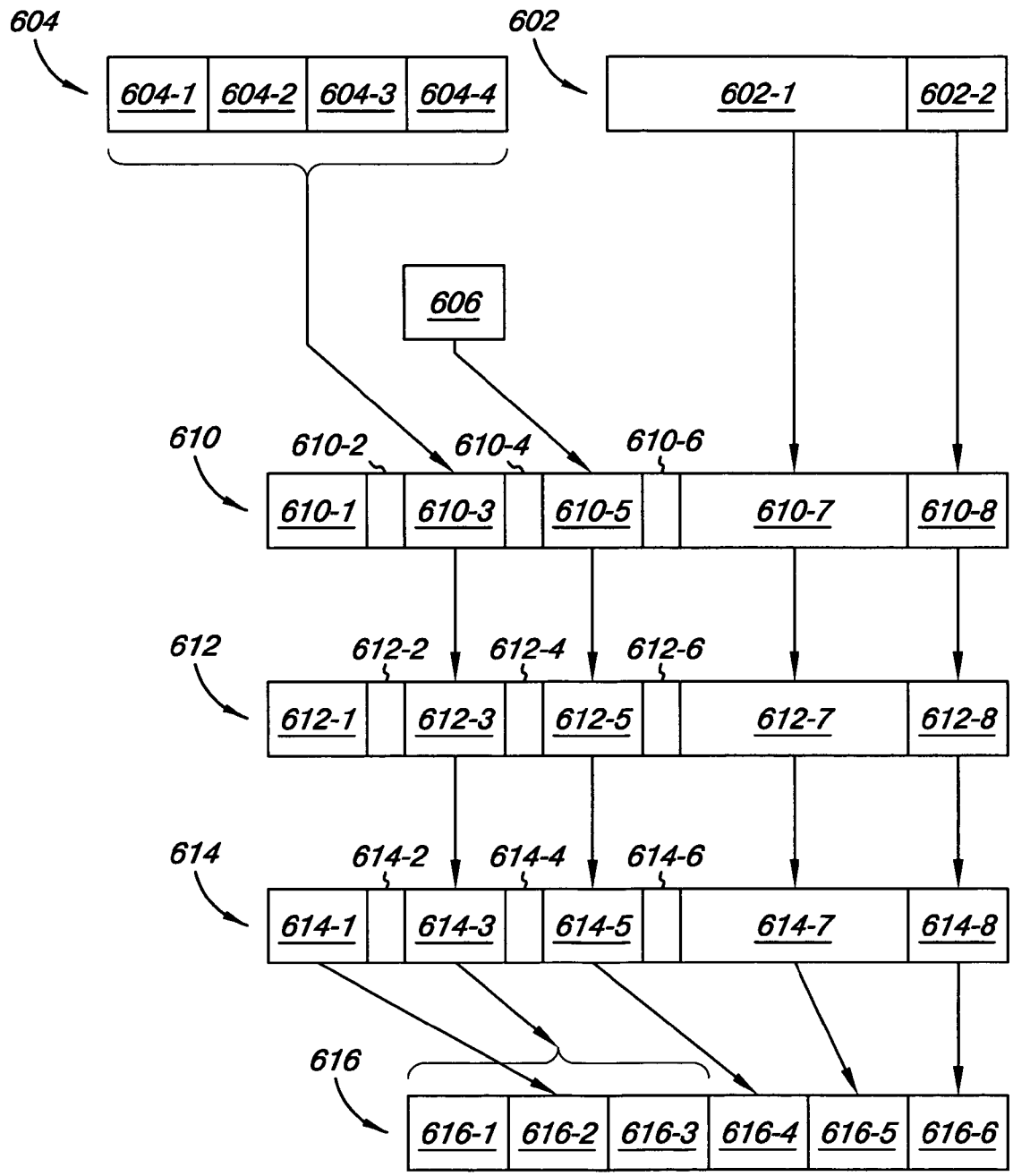
FIG. 6 illustrates another sequence embodiment for data packet configuration that provides packet protection for header modification.

FIG. 6 illustrates another sequence embodiment for data packet configuration that provides packet protection for header modification associated with packets arriving into a port on a network chip. FIG. 6 illustrates an embodiment for header modification as may occur in connection with packet encapsulation as packets are received to any network port on a given network chip. An example of illustrating packet encapsulation is provided in copending, commonly assigned application, entitled, "Encapsulating Packets for Network Chip Conduit Port" filed on Mar. 23, 2005, and incorporated herein in full by reference. While the above referenced application addresses forwarding packets to a processor on a given network device, the reader will appreciate there are a number of reasons why encapsulation of packets may be desired when exchanging packets through a port on a network chip.

As described in the above referenced application, FIG. 6 illustrates an embodiment by which a network chip is adapted to add additional data for additional functionality to certain packets in order to send the certain packets to the processor. As shown in FIG. 6 a network chip's inbound memory system can receive a packet 602 from one of its external network ports. As described above the packet can include a data (message) portion 602-1, e.g., an Ethernet frame, as well as a first verification key 602-2, e.g., an Ethernet trailer including a 32 bit CRC.

As shown at block 606, the logic circuitry on the given number of network chips provides additional data for additional functionality 606. The additional data includes, by way of example and not by way of limitation; data for the processor relating to processing the packet; data for prioritizing packets to the processor; data to filter packets based on a media access controller (MAC) destination address (DA); data to add information relating to an external port on which a given packet arrived to the device; data to add information relating to explicit forwarding instructions; and data to add information relating to whether the packet has already been transmitted from an external port.

According to various embodiments, software encapsulation registers 604 are provided which are adapted to enclose both the original Ethernet frame packet 602 and the above described additional data for additional functionality 606. In some embodiments portions of the additional data for additional functionality are included in the encapsulation process as encapsulation data. That is, the SW encapsulation registers can provide; encapsulated data for a destination address (DA) 604-1, encapsulated data for a source address 604-2, encapsulated data for packet length and type information 604-3, and encapsulated data for PAD information 604-4. And, by way of example and not by way of limitation, the encapsulation data can provide additional data to assist in passing the original Ethernet packet 602 through an internal switching fabric and through an internal (to the device) hub and/or switch. Thus, one principle of the embodiments is to add additional data 606 for passing with the packet. However, according to embodiments herein, the additional data 606 is also encapsulated to protect the added additional data 606 while passing through the circuitry described above and to make the original Ethernet packet frame 602, now having such additional data 606, continue to maintain an appearance of an Ethernet frame format.

According to various embodiments, instruction and/or logic embodiments can operate to produce the packet 610. In the embodiment of FIG. 6, packet 610 represents a packet as it is provided to the switching fabric of a network device, e.g., 404 as shown in FIG. 4. As shown in FIG. 6, as the packet 610 moves up the TCP/IP protocol stack the logic can add an internal switch header structure 610-1, along with a verification key 610-2 as the same has been described above, before passing the packet 610 through the switching fabric. The packet 610 is illustrated including this internal switch header structure 610-1, the above described encapsulation bytes 610-3, the additional data 610-5 (previously shown as 606), the original Ethernet frame 610-7 (previously shown as 602-1), and the first verification key 610-8 associated with the original Ethernet frame, e.g., body portion of the packet 610.

Instruction and/or logic embodiments, as described herein, can operate to provide another more easily modifiable verification key to the internal switching header, e.g., verification key 610-2, the encapsulation bytes, e.g., 610-4, and the additional data, e.g., 610-6, in the manner described above in connection with FIG. 5. Embodiments, however, are not limited to the example illustrated in FIG. 6. That is, while there can be a unique verification key to each of these new portions to a packet each new portion does not have to have its own unique verification key in the various embodiments. For example, the single error checking sequence of bits in 610-2, appropriately modified, could be used to cover packet portions 601-1, 610-3, and 610-5. Separately there could be an additional parity bit on part of 610-1, e.g., the length information field, since may be a significant aspect to the operation of a given layer 3 switch.

Packet 612 possesses a similar structure to that of 610 except that the internal switch header structure 610-1 may be operated on to create a slightly different internal switch header structure 612-1 as the packet is transmitted across the high speed switching fabric. Accordingly, in the manner described above, a new verification key 612-2 can be associated therewith. Packet 612 further includes the encapsulation bytes 612-3 (previously shown as 610-3), the additional data 612-5 (previously shown as 610-5), the original Ethernet frame 613-7 (previously shown as 610-7), and the first verification key 612-8 (previously shown as 610-8). As the reader will appreciate, the instruction and/or logic embodiments can operate to check, modify, and operate on the now different internal switching header to provide verification key 612-2. The logic can operate to check, modify, and operate on (e.g., change as needed) the encapsulation bytes 612-3 to provide verification key 612-4. The logic can operate to check, modify, and operate on the additional data 612-5 to provide verification key 612-6, in the manner described above in connection with FIG. 5. Again, embodiments do not have to use all of the unique verification keys described in this example.

In the embodiment of FIG. 6, packet 614 represents the data packet as it is received to the outbound memory system of a selected network chip to exchange packets with a processor of the network device (as shown in FIG. 4). The data packet 614 possesses a similar structure to that of 612 except that the internal switch header structure 612-1 may be operated on again by the logic circuitry to create a slightly different internal switch header structure 614-1 as the packet is awaiting transmission to the processor, e.g., moving through a layer 3 switch. Packet 614 includes the encapsulation bytes 614-3 (previously shown as 612-3), the additional data 614-5 (previously shown as 612-5), the Ethernet frame 614-7 (previously shown as 612-7), and the first verification key 614-8 (previously shown as 612-8). As the reader will appreciate, the instruction and/or logic embodiments can operate to check, modify, and operate on the now different internal switching header to provide verification key 614-2. The logic can operate to check, modify, and operate on (e.g., change as needed) the encapsulation bytes 614-3 to provide verification key 614-4. The logic can also operate to check, modify, and operate on the additional data 614-5 to provide verification key 614-6, in the manner described above in connection with FIG. 5.

Packet structure 616 can represent the data packet as it is sent out an external port of a network chip, or layer 3 switch, in encapsulated format. received by the processor. As shown illustrated in embodiment of FIG. 6, packet 616 can include the encapsulation data, shown previously as 614-3 and now illustrated as 616-1 and 616-3. A portion of the encapsulation data can include destination and source address information, shown as 616-1. The encapsulation data structure can include another portion 616-2 to serve as tags for the processor as taken from the previous internal switch header structure 614-1, e.g., virtual local area network (VLAN) tags to encode priority. Packet 616 includes the additional data 616-4 (previously shown as 614-5), the original Ethernet frame 616-5 (previously shown as 614-7), and a first verification key 616-6. In packet 616, the first verification key will actually be a re-computed CRC, as it now covering the entire packet 616 in order for other networking devices to properly understand the Ethernet frame.

Figure 7:
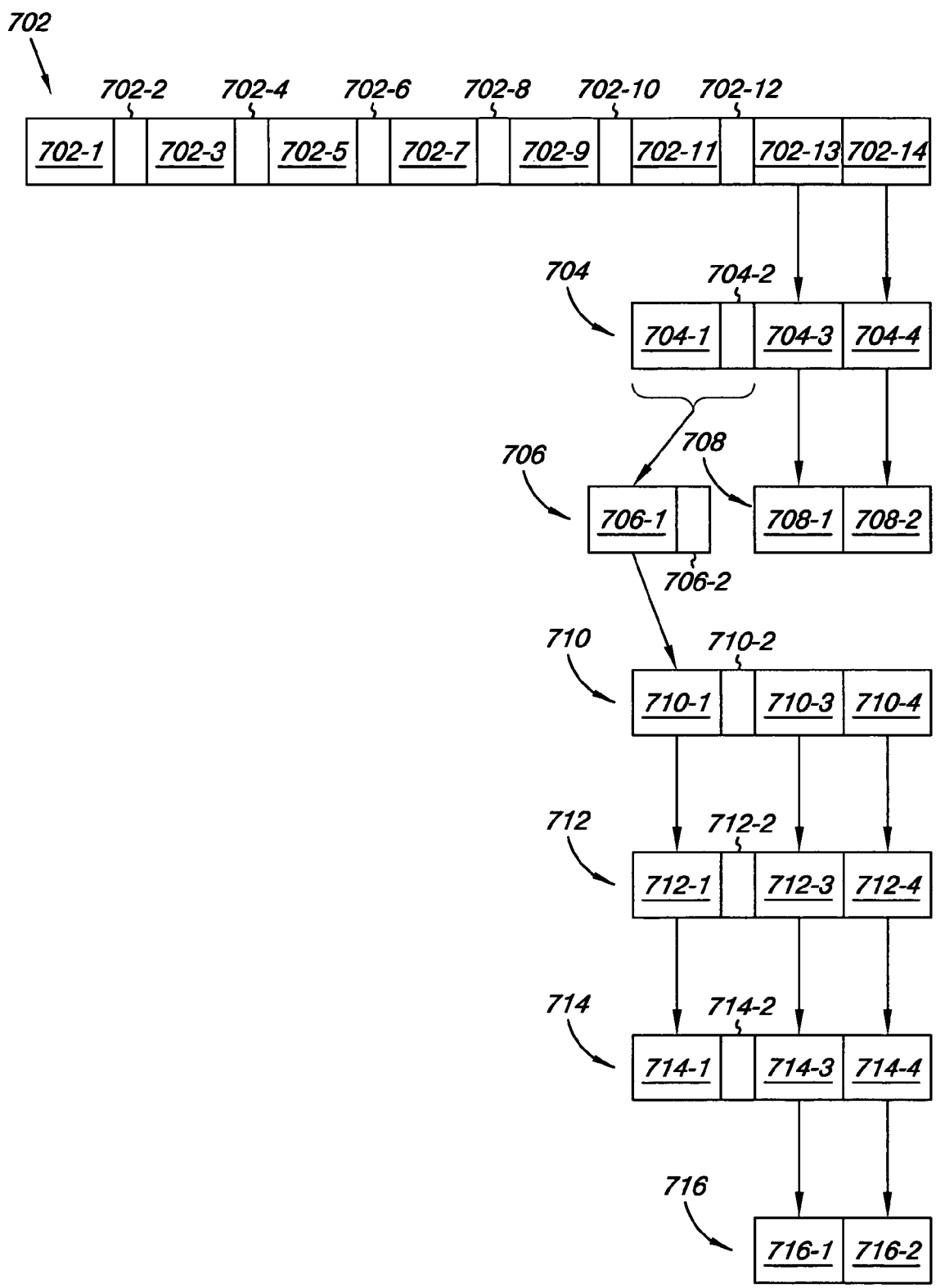
FIG. 7 illustrates another sequence embodiment for data packet configuration that provides packet protection for header modification.

FIG. 7 illustrates another sequence embodiment for data packet configuration that provides packet protection for header modification going out of ports onto the physical layer. Thus, FIG. 7 illustrates one embodiment by which the logic circuitry on the one or more network chips can operate on received packets to send the packets from a processor on the network device to local processing on a given network chip and/or out an external port on a given network chip. FIG. 7 also illustrates an embodiment in which additional data, for additional functionality, has been added to certain packets in order to send the packets to local processing on a given network chip and/or out an external port on a given network chip.

As described in the above referenced, copending application, a processor on a given network device can include logic circuitry and/or software to encapsulate media access controller (MAC) destination address (DA) (also referred to as MAC-DA) information 702-1 (such that a network chip can filter packets based on a DA), to encapsulate source address information 702-3, to encapsulate virtual LAN tags (if present) 702-5, to encapsulate length and type information 702-7, and to encapsulate PAD/CTL type information 702-9, etc, onto packet 702. The processor can also be adapted to add data for additional functionality among the number of network chips on the device relating to processing the packet, e.g., to add explicit forwarding instructions, to add information relating to whether the packet has already been transmitted from an external port on the device, etc, within block 702-11. The packet, illustrated at 702, will additionally include the data (message) 702-13, and the first verification key 702-14. As the reader will appreciate, the instruction and/or logic embodiments can operate to check, modify, and operate on the MAC-DA information 702-1 to provide verification key 702-2. The instruction and/or logic embodiments can operate to check, modify, and operate on the encapsulated source address information 702-3 to provide verification key 702-4. The instruction and/or logic embodiments can operate to check, modify, and operate on the encapsulated virtual LAN tags 702-5 to provide verification key 702-6. The instruction and/or logic embodiments can operate to check, modify, and operate on the encapsulated length and type information 702-7 to provide verification key 702-8. Additionally, the instruction and/or logic embodiments can operate to check, modify, and operate on the encapsulated PAD/CTL type information 702-9 to provide verification key 702-10. And, the instruction and/or logic embodiments can operate to check, modify, and operate on the additional functionality 702-11 to provide verification key 702-12, each according to the manner described above in connection with FIG. 5.

Embodiments do not have to use all of the unique verification keys described in the example of FIG. 7. That is, while there can be a unique verification key to each of the above portions to a packet each portion does not have to have its own unique verification key in the various embodiments. As the reader will appreciate, among various embodiments a balance exists between having multiple, additional verification keys and reducing complexity, as well as size (in bits), the error checking techniques involved with any given packet.

In the embodiment of FIG. 7, packet 704 illustrates the packet once a filter has striped off the encapsulation and operates on the received packet. The packet will appear as the packet 704. Packet 704 includes the additional data for the added functionality, now shown as 704-1, the data (message) 704-3, and the first verification key 704-4. Depending on where a given packet originates, the first verification key 704-4 may be different from 702-14 (i.e., 714-14 may cover the entire packet 702) or may be the same. As described herein, the instruction and/or logic embodiments can operate to check, modify, and operate on added functionality 704-1 to provide verification key 704-2.

In this example, the logic of the network chip can strip off the additional data for the added functionality 706, now shown as 706-1 with its associated verification key 706-2, and can operate thereon to determine what to do with the remaining data (message) 708, now shown as 708-1 with its associated first verification key 708-2.

As shown in the embodiment of FIG. 7, network chip can use the additional information derived from the added data 706 to configure packet 710. Packet 710 includes a newly added internal switch header structure 710-1 and the data (message) 710-3 with its associated first verification key 710-4, such that the packet 710 can be forwarded to the switching fabric. As described herein, a verification key 710-2 can be associated with the newly added internal switch header structure 710-1.

Packet 712 illustrates that as the packet is transmitted across the switching fabric of the device it can be operated on again to modify the internal switch header structure 712-1 attached to the data (message) 712-3. As described herein, a verification key 712-2 can be associated with the newly added internal switch header structure 712-1 and the data (message) can continue to maintain its associated first verification key 712-4. Further, according to embodiments, when the packet 714 is in the outbound memory structure of the intended network chip the packet can again be operated on to modify the internal switch header structure 714-1 attached to the data (message) 714-3. As described herein, a verification key 714-2 can be associated with the newly added internal switch header structure 714-1 and the data (message) can continue to maintain its associated first verification key 714-4.

Packet 716 illustrates the packet once again as an Ethernet frame. As illustrated in packet 716, the Ethernet frame 716 can include the original Ethernet frame 716-1, shown as 602-1 in FIG. 6, including destination and source address information, length and type information and the rest of the packet contents, as the same will be known and understood by one of ordinary skill in the art. Again, as described above, the packet 716 will have a new first verification key 716-2, e.g., CRC, calculated and associated to the Ethernet frame 716-1 as the packet 716 leaves the layer 3 switch.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network device, comprising:
   logic associated with the operations of a data communications protocol stack; and
   wherein the logic which can operate to:
   receive a packet to the network device;
   apply a first error checking technique, having a first modification complexity, to a header of the packet;
   apply a second error checking technique, having a second modification complexity that is greater than the first modification complexity, to a body of the packet; and
   provide a first verification key to a first header associated with the packet and a second verification key, having a different modification complexity from the first verification key, to a second header associated with the packet.

2. The device of claim 1, wherein the logic is operable to apply the first error checking technique and the second error checking technique to the packet at different times within a same layer of a protocol communications stack.

3. The device of claim 1, wherein the logic is operable to apply error checking techniques within a layer 3 switch.

4. A computing device, comprising:
   a number of network chips including ports to receive a packet to the network device, at least one network chip includes means for:
   providing a first verification key to a body of the packet;
   associating more than one header with the body of the packet;
   providing a second verification key, which is more easily modifiable than the first verification key, to a first header associated with the packet; and
   providing a third verification key to a second header associated with the packet.

5. The computing device of claim 4, wherein the means for includes logic to modify and verify the first verification key associated with the body of the packet, logic to modify and verify the second verification key associated with the first header associated with the packet; logic to modify and verify the third verification key associated with the second header associated with the packet.

6. The computing device of claim 4, wherein the first verification key is a cyclical redundancy check (CRC), and wherein the second verification key is associated with an error checking technique selected from the group of:
   parity; and
   checksum.

7. A network, comprising:
   a number of network devices connected to one another;
   a number of ports to transmit a packet received to at least one of the number of network devices; and
   logic on one of the network device operable as a layer three (3) switch to:
   check a first verification key associated with a data portion of the packet;
   add different verification keys, which are more easily modifiable than the first verification key, to one or more different headers associated with the packet as the packet moves through the layer three switch: and
   provide a second verification key to a first header associated with the packet and a third verification key, having a different modification complexity from the second verification key, to a second header associated with the packet.

8. The network of claim 7, wherein the logic is operable to check the different verification keys added to the one or more different headers while the packet is in the layer 3 switch.

9. A computer implemented method for moving packets, comprising:
   receiving a packet to a computing device;
   applying a first error checking technique, having a first modification complexity, to a body of the packet;
   applying a second error checking technique, having a second modification complexity that is lower than the first modification complexity, to a header of the packet;
   associating more than one header with the body of the packet; and
   providing a first verification key to a first header associated with the packet and a second verification key, having a different modification complexity from the first verification key, to a second header associated with the packet.

10. The method of claim 9, wherein the method includes providing a third verification key to a body portion of the packet.

11. A computer implemented method for moving packets on a computing device, comprising:
  receiving a packet to the computing device;
  providing a first verification key having a first modification complexity to a body of the packet;
  providing a second verification key having a second modification complexity that is lower than the first modification complexity to a header associated with the body;
  associating more than one header with the body of the packet;
  providing the second verification key to a first header associated with the packet; and
  providing a third verification key to a second header associated with the packet.

12. The method of claim 11, wherein the first verification key involves at least 32 bits and the second verification key involves 1-16 bits.

13. The method of claim 11, wherein the second verification key can be more easily modified than the first verification key.

14. The method of claim 11, wherein the second verification key is a parity bit and the first verification key is at least a 32 bit cyclical redundancy check (CRC).

15. The method of claim 11, wherein the method is performed on a layer 3 switch.

* * * * *